United States Patent [19]
Tsuchiya et al.

[11] Patent Number: 5,992,180
[45] Date of Patent: Nov. 30, 1999

[54] METHOD AND APPARATUS FOR BEND-SHAPING A GLASS PLATE

[75] Inventors: Masahiro Tsuchiya; Tsuyoshi Kawaguchi, both of Chita-gun; Ken Nomura; Kohei Yoshino, both of Aiko-gun, all of Japan

[73] Assignee: Asahi Glass Company Ltd., Tokyo, Japan

[21] Appl. No.: 09/129,748

[22] Filed: Aug. 5, 1998

[30] Foreign Application Priority Data

Aug. 6, 1997 [JP] Japan ..................................... 9-224284

[51] Int. Cl.$^6$ ................................................. C03B 23/023
[52] U.S. Cl. ................................. 65/102; 65/106; 65/107; 65/114; 65/269; 65/273; 65/285; 65/286; 198/463.2; 198/468.01; 198/468.9
[58] Field of Search ............................... 65/102, 106, 107, 65/114, 269, 273, 285, 286; 198/463.2, 468.01, 468.9

[56] References Cited

U.S. PATENT DOCUMENTS 4,123,246 10/1978 Johnson .
4,139,359 2/1979 Johnson et al. .
4,670,036 6/1987 Enk et al. .

FOREIGN PATENT DOCUMENTS 6-247729 9/1994 Japan .

Primary Examiner—Stanley S. Silverman
Assistant Examiner—Michael P. Colaianni
Attorney, Agent, or Firm—Oblon, Spivak, McClelland, Maier & Neustadt, P.C.

[57] ABSTRACT

A glass plate is heated in a heating furnace and is bend-shaped to be a complexly curved glass plate while the glass plate is passed on curved rollers wherein support pads of a pushing mechanism push the complexly curved glass plate from an upstream side to a downstream side of a transferring device in a state that a rear edge of the complexly curved glass plate is supported by the support pads whereby the complexly curved glass plate is delivered to a cooling device side while a turning movement of the complexly curved glass plate is controlled during the transfer.

19 Claims, 15 Drawing Sheets

METHOD AND APPARATUS FOR BEND-SHAPING A GLASS PLATE

BACKGROUND OF THE INVENTION

1. Field of the Invention

The present invention relates to a method and an apparatus for bend-shaping a glass plate for windows for transporting machines such as automobiles, ships, airplanes and windows for buildings, in particular, for windows of automobiles.

2. Discussion of Background

In recent years, there has been used a glass plate having radii of curvature not only in a single direction but also plural directions (hereinbelow, referred to as a complexly curved glass plate) in a window for an automobile For example, U.S. Pat. No. 4,123,246 discloses a method for forming such complexly curved glass plate. The specification of the patent describes a method for forming a complexly curved glass plate by transferring by means of a plurality of rollers a glass plate heated to the nearly softening temperature in a heating furnace.

In this case, the glass plate softened by heating is transferred by the rollers wherein the central portion of each of the rollers are curved downward in a direction perpendicular to a transferring direction (hereinbelow, referred to as a transfer perpendicular direction). Then, the central portion of the glass plate drops due to its dead weight whereby it is bend-shaped in the transfer perpendicular direction so as to follow a radius of curvature of the curved rollers. Further, the plurality of curved rollers are arranged to have an inclination in the transferring direction. When the glass plate is transferred on the curved rollers, it is bent so as to follow the inclination of the curved rollers whereby bend-shaping is conducted to the glass plate with respect to the transferring direction. Thus, the glass plate is bend-shaped in the transferring direction and the transfer perpendicular direction whereby the complexly curved glass plate having radii of curvature in two directions is formed.

The complexly curved glass plate after having been bend-shaped is transferred to a cooling device where it is quenched and toughened by cooling air blasted from the cooling device.

The method described in the above-mentioned specification has the problem as follows. A contacting surface area between the complexly curved glass plate bend-shaped and the rollers tends to decrease. In transferring the complexly curved glass plate, therefore, the gravity center of the complexly curved glass plate is sometimes shifted toward the deepest portion of the curved rollers. Accordingly, the complexly curved glass plate may shift in the transferring direction and the transfer perpendicular direction, and may turn on the curved rollers.

On the other hand, for the purpose of substantially uniformly cooling the complexly curved glass plate, the cooling device is so constructed as to adjust the position and the height of nozzles for blasting cooling air depending on a shape of the complexly curved glass plate. In this case, the position and so on of the nozzles of the cooling device are determined on the premise that the complexly curved glass plate is transferred in a state free from turning. Accordingly, when the complexly curved glass plate is transferred to the cooling device in a state of turning on the curved rollers, the turning complexly curved glass plate partially comes closer to or separate from the nozzles.

Since efficiency for cooling the complexly curved glass plate depends on a distance between the nozzles and the complexly curved glass plate, a portion easily cooled and a portion difficult to cool are produced in the turning complexly curved glass plate. As a result, a temperature distribution wherein there are a portion of higher temperature and a portion of lower temperature is formed in the complexly curved glass plate. Thus, in such case of turning of the complexly curved glass plate, there are disadvantages that the complexly curved glass plate can not uniformly be quenched and that the complexly curved glass plate may be broken due to a tensile stress or a compressive stress caused by a temperature distribution.

The present invention has been achieved in view of the problems in the conventional technique and to provide a method and an apparatus for bend-shaping a glass plate which avoids the turning of a complexly curved glass plate; equalizes substantially a temperature distribution in the complexly curved glass plate when it is cooled in a cooling device; and prevents a deformation of the complexly curved glass plate.

SUMMARY OF THE INVENTION

In accordance with the present invention, in order to solve the above-mentioned problems, there is provided a method for bend-shaping a glass plate which comprises a transferring step of placing a glass plate on a plurality of rotating rollers to transfer the glass plate in a transferring direction A; a heating step of heating the glass plate transferred in the transferring step to a shaping temperature in a heating furnace; a bending step of bend-shaping the glass plate heated in the heating step to form a complexly curved glass plate having radii of curvature in plural directions; and a cooling step of cooling the complexly curved glass plate transferred in the transferring step in a cooling device provided at a downstream side of the bending step, wherein a pushing step is provided between an upstream end of the bending step and an upstream end of the cooling step to move the complexly curved glass plate on the rollers in the transferring direction A by pushing an upstream side edge of the complexly curved glass plate, the pushing step being reciprocated between the upstream end of the bending step and the upstream end of the cooling step.

Further, in accordance with the present invention, there is provided an apparatus for bend-shaping a glass plate which comprises a transferring means for mounting a glass plate on a plurality of rotating rollers to transfer the glass plate in a transferring direction A; a heating furnace provided at an upstream side of the transferring means to heat the glass plate to a shaping temperature; a bend-shaping means provided at a downstream side of the heating furnace to bend-shape the glass plate into a complexly curved glass plate having radii of curvature in plural directions; and a cooling means provided at a downstream side of the bend-shaping means to cool the complexly curved glass plate transferred by the transferring means, wherein a pushing mechanism is provided between an upstream end of the bend-shaping means and an upstream end of the cooling means to move the complexly curved glass plate on the rollers in the transferring direction A by pushing an upstream side edge of the complexly curved glass plate, the pushing means being reciprocated between the upstream end of the bend-shaping means and the upstream end of the cooling means.

In the pushing step, the complexly curved glass plate is pushed to the transferring direction to move the complexly curved glass plate on the rollers in the transferring direction whereby a shift of the complexly curved glass plate in the transfer perpendicular direction can be prevented, and a change of distance between nozzles in the cooling device and the complexly curved glass plate can be prevented. Further, a plurality of complexly curved glass plates can successively be formed because glass plates are successively transferred in the transferring step; are heated in the heating step, and then, are bend-shaped in the bending step.

It is preferable for the bending step to constitute that the glass plate is bend-shaped in the transferring direction by the rollers arranged with an inclination in the transferring direction and the glass plate is bend-shaped in the direction perpendicular to the transferring direction so as to follow the rollers which are curved in the direction perpendicular to the transferring direction.

With such construction, in the bending step, the glass plate is transferred by the rollers arranged with an inclination with respect to the transferring direction to bend-shape the glass plate in the transferring direction. Further, in the bending step, the softened glass plate is transferred by the rollers which are curved in the direction perpendicular to the transferring direction to thereby bend-shape the glass plate along the rollers in the transfer perpendicular direction. Thus, the complexly curved glass plate bent in two directions: the transferring direction and the transfer perpendicular direction can be obtained.

It is also possible that in the bending step, the glass plate is bend-shaped in the transferring direction by interposing it between an upper mold and a lower mold, and then, the glass plate is bend-shaped along curved rollers in the direction perpendicular to the transferring direction. In this case, peripheral edge portions of the glass plate can largely be bend-shaped in the bending step, and a complexly curved glass plate having curves in two directions of the transferring direction and the transfer perpendicular direction can be obtained.

Further, it is preferable in the pushing step to provide a structure for pushing the shaped complexly curved glass plate on the rollers in the transferring direction in a state that a rear edge of the glass plate is supported at at least two positions.

In the pushing step, since the rear edge of the complexly curved glass plate is supported at at least two positions, a turning movement of the complexly curved glass plate can be controlled while the glass plate is delivered on the rollers in the transferring direction. Further, in the cooling step, cooling air is supplied from the cooling device to the complexly curved glass plate free from turning to cool the complexly curved glass plate, whereby a temperature distribution in the complexly curved glass plate can substantially be uniform.

Also, it is preferable in the pushing step to use a structure for moving the glass plate at a transfer speed slightly faster than the transfer speed of the transferring means. In the pushing step, accordingly, the complexly curved glass plate can be delivered at a speed slightly faster than the transfer speed of the transferring means in a state that the rear edge of the complexly curved glass plate is supported at at least two positions.

DESCRIPTION OF PREFERRED EMBODIMENT

Figure 1:
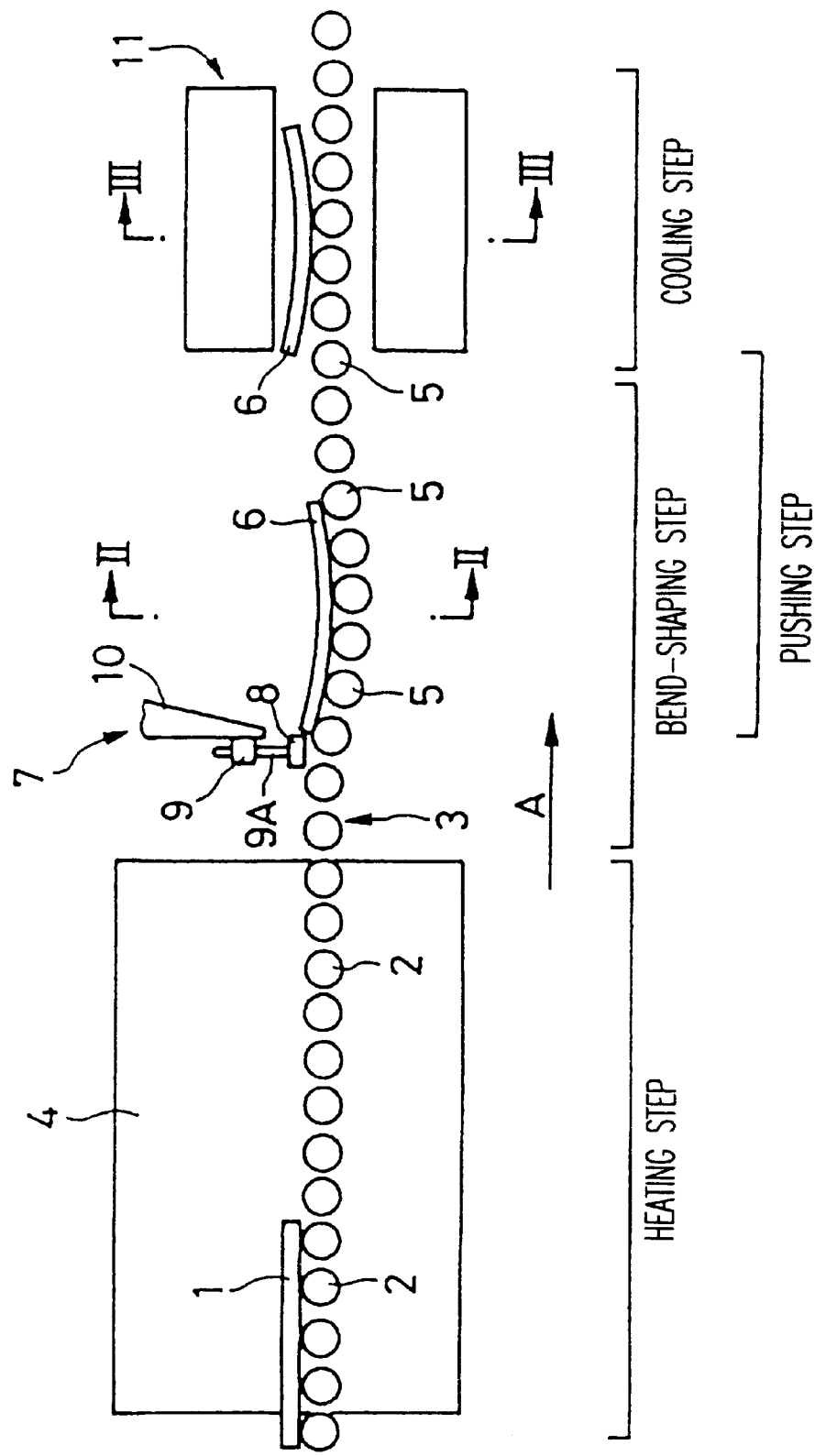
FIG. 1 is an overall structural diagram showing a bending device for a glass plate according to a first embodiment of the present invention.

Preferred embodiments of the method and the apparatus for bend-shaping a glass plate according to the present invention will be described with reference to the drawings.

FIGS. 1 to 7 show the first embodiment of the apparatus for bend-shaping a glass plate according to the present invention.

A flat plate-like glass plate 1 is placed on a plurality of rotating rollers 2 and is transferred from an upper stream side to a lower stream side in a transferring direction A. The rollers 2 constitute a transferring device 3 along with curved rollers 5 (which will be described later) provided at a downstream side thereof.

A heating furnace 4 is provided at an upstream side of the transferring device 3. Electric heaters or gas burners or the like (not shown) are provided in the heating furnace 4. The heating furnace 4 heats the glass plate 1 transferred by the transferring device 3 to a nearly glass softening temperature (for example, about 580–700° C.)

Figure 2:
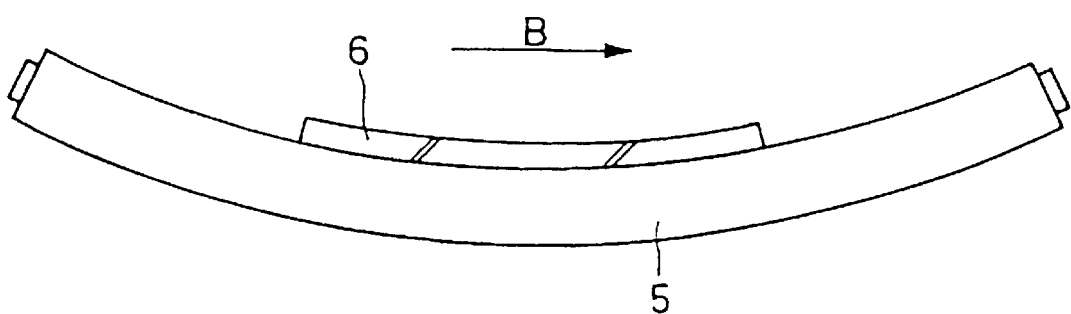
FIG. 2 is a front view of a curved roller viewed from a direction II—II in FIG. 1.

The curved rollers 5, 5, . . . are arranged at a downstream side of the heating furnace 4 in substantially parallel to each other to thereby constitute a bend-shaping means. The axial direction of each of the curved rollers 5 coincides with the transfer perpendicular direction B as shown in FIG. 2. The curved rollers 5 are curved in a manner that the position of the central portion in the axial direction is lower than the position of both end portions. Accordingly, the glass plate 1 on the curved rollers 5, 5, . . . is curved to follow the shape of the curved rollers 5 due to its own weight while the glass plate is transferred on the curved rollers 5, 5, . . . Thus, the glass plate 1 is bend-shaped in the transfer perpendicular direction B.

The plurality of curved rollers 5, 5, . . . are arranged with an inclination with respect to a horizontal direction. Accordingly, the glass plate 1 is curved to follow the inclination while the glass plate is transferred on the curved rollers 5, 5, . . . whereby it is bend-shaped in the transferring direction A. Thus, the glass plate 1 is bend-shaped to be a complexly curved glass plate 6 having radii of curvature in two directions: the transferring direction A and the transfer perpendicular direction B.

A pusher 7 constitutes a pushing mechanism for pushing the complexly curved glass plate 6 from its rear edge side in the transferring direction A. The pusher 7 comprises, for example, two support pads 8, an actuator 9 for driving vertically the support pads 8 and a moving section 10 for moving the support pads 8 along with the actuator 9 in the transferring direction A. The support pads 8 in this embodiment are respectively made of metallic plates of square shape (80×80 mm) which may be covered with a heat insulating material depending on requirement.

The moving section 10 is attached to a rail (not shown), for example, extended above the transferring device 3 so as to be movable in the transferring direction. The moving section 10 supports the actuator 9 which is provided with rods 9A which are movable in a vertical direction. Each of the support pads 8 is fixed to a lower end of each of the rods 9A.

The support pads 8 can be raised upward by the actuator 9 when the glass plate 1 is transferred from the heating furnace 4 whereby they do not contact with the glass plate 1. When the glass plate 1 is transferred on the curved rollers 5 to be bend-shaped into the complexly curved glass plate 6, the support pads 8 are lowered toward the curved rollers 5 by the actuator 9.

The support pads 8 are moved by the moving section 10 in the transferring direction A. In this case, the moving section 10 moves in the transferring direction A on the transferring device 3 at a speed slightly faster than the transfer speed that the complexly curved glass plate 6 is transferred according to the rotation of the curved rollers 5 (for example, a speed about 5–15% faster than the transfer speed). Accordingly, the support pads 8 come to contact with the rear edge of the complexly curved glass plate 6 to support the complexly curved glass plate 6 from its rear edge side (an upper stream side) and to restrict a turning movement of the complexly curved glass plate 6. Then, the complexly curved glass plate 6 is transferred to a cooling device 11 as described hereinbelow in a state that the turning is restricted by the support pads 8.

The curved rollers 5, 5, . . . are arranged with an inclination. Accordingly, the position in the vertical direction of the rear edge of the complexly curved glass plate 1 varies during the transfer. Therefore, if the support pads 8 are straightly moved in the transferring direction A, they can not effectively support the rear edge of the complexly curved glass plate 6. It is therefore preferable to move the position of the support pads 8 in a vertical direction in response to a change of position in a vertical direction of the rear edge of the complexly curved glass plate 6. Specifically, the position of the support pads 8 in a vertical direction is changed during the transfer of the complexly curved glass plate by controlling the actuator 9.

Figure 15:
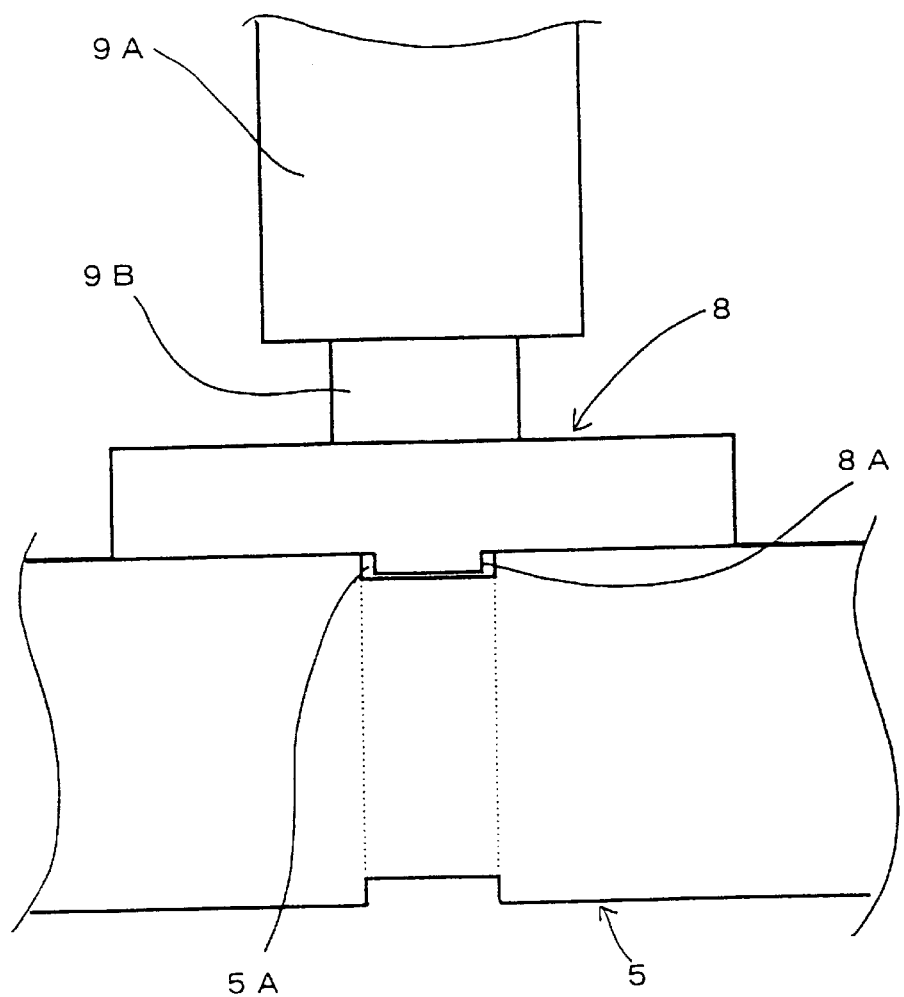
FIG. 15 is a side view of an important portion of a pushing mechanism according to the present invention.

Alternatively, the support pads 8 may be attached to the rods 9A by interposing elastic materials 9B such as springs as shown in FIG. 15. In this case, a projection 8A is provided at a lower face side of each of the support pads as shown in FIG. 15 whereby the projection 8A is inserted into a groove 5A formed in each of the curved rollers 5 to elastically push the support pads 8 to the curved rollers 5. In this case, adjustment is so made that when the elastic materials 9B are in a substantially stretched state, the rear edge of the complexly curved glass plate is at the lowest position. When the rear edge of the complexly curved glass plate is in an upper position, the elastic materials 9B shrink whereby the complexly curved glass plate 6 can be pushed by the support pads 8 in a state that the projections 8A are inserted into the grooves 5A. Although the curved rollers 5 are curved, the support pads 8 are in a flat plate-like form. Accordingly, the elastic materials 9B preferably give a swinging function to the support pads 8 so that the glass plate can follow the curved rollers 5. In this case, the swinging function to the support pads 8 can prevent an undesired movement in an engaging state between the grooves 5A and the projections 8A. In this embodiment, the depth of the grooves 5A is about 2–5 mm, the width of the grooves 5A is about 10–15 mm, and the height and the width of the projections 8A are respectively about 1–2 mm smaller than the depth and the width of the grooves 5A.

When the support pads 8 reach an upstream side of the cooling device 11, the moving section 10 is stopped. Then, the complexly curved glass plate 6 is transferred by the curved rollers 5 toward the cooling device 11, and the pusher 7 is moved to an upstream side of the curved rollers 5. Thus, with a reciprocating movement of the pusher 7 above the curved roller 5, the complexly curved glass plate 6 is transferred to the cooling device 11 (described below) in a state that the turning is controlled.

In order to control certainly the turning of the complexly curved glass plate 6, a stroke distance of the pusher moving in the transferring direction A should be longer. However, when the stroke distance of the pusher 7 is excessively long, productivity for the complexly curved glass plate 6 is reduced because the shaping of the next complexly curved glass plate 6 can not be conducted while the pusher 7 is moving in the transferring direction A. Accordingly, the stroke distance of the pusher 7 is determined, for example, between a position before or near the curved rollers 5 and a position near the inlet of the cooling device 11. When it is desired to prevent the turning of the complexly curved glass plate in the cooling device, it is preferable to extend the stroke distance of the pusher to an intermediate portion in the cooling device.

Figure 3:
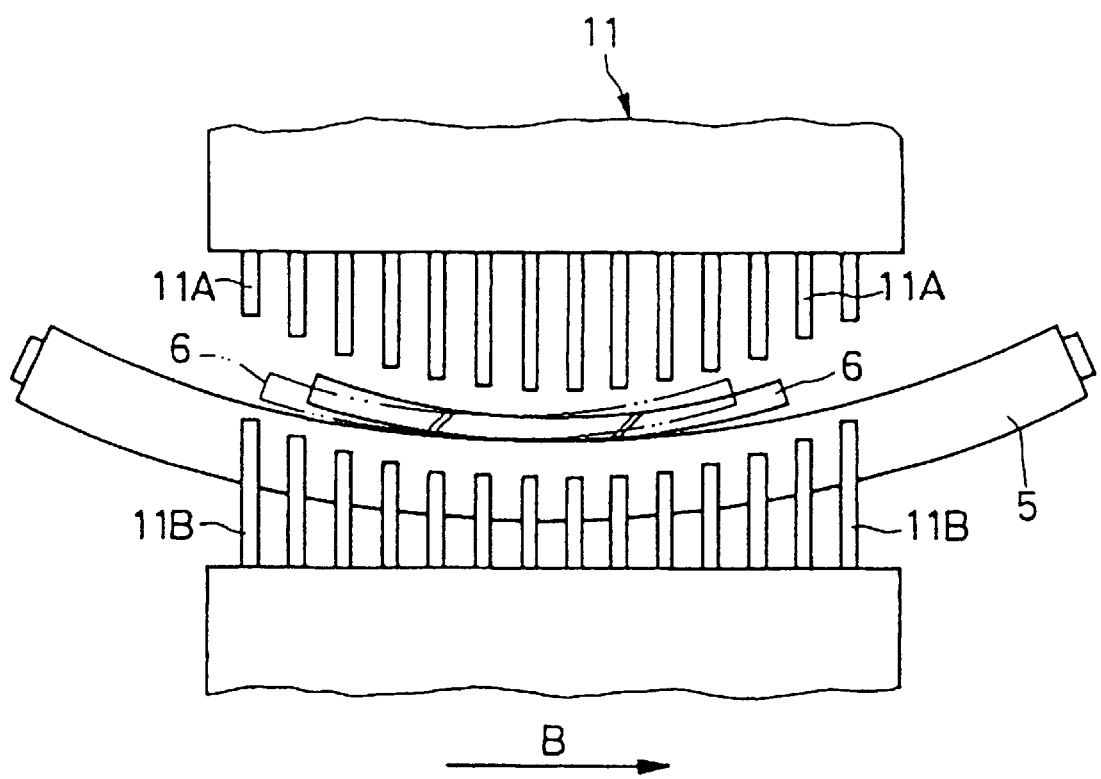
FIG. 3 is a cross-sectional view of a cooling device viewed from a direction III—III in FIG. 1.

The cooling device 11 cools the complexly curved glass plate 6. As shown in FIG. 3, the cooling device 11 is provided with a plurality of nozzles 11A which are arranged at an upper side of the curved rollers 5 and a plurality of nozzles 11B which are arranged at a lower side of the curved rollers 5. Accordingly, the complexly curved glass plate 6 is quenched and toughened by blasting cooling air to the complexly curved glass plate 6 through the nozzles 11A, 11B.

A method for bend-shaping a glass plate to form the complexly curved glass plate 6 by using the apparatus for bend-shaping a glass plate in this embodiment will be described with reference to FIGS. 5 to 7.

Figure 5:
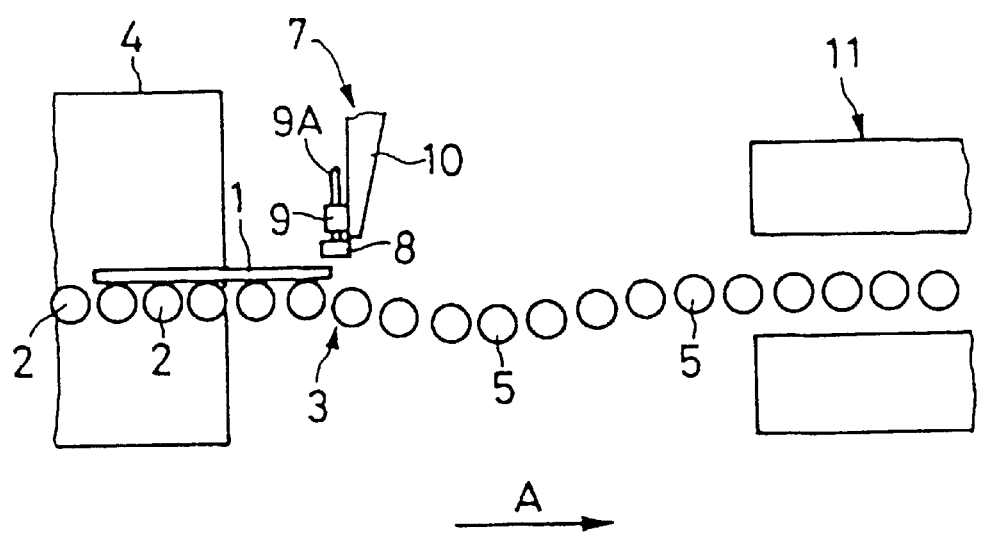
FIG. 5 is a diagram showing a movement of a pusher in a transient time from a heating step to a bending step in the first embodiment.

In a transferring step, a glass plate 1 is placed on rollers 2 as shown in FIG. 5. By rotating the rollers, the glass plate 1 is transferred from an upstream side in the transferring direction A to a downstream side.

In a heating step, the glass plate 1 is transferred into the heating furnace 4 by means of the transferring device 3 wherein the glass plate 1 is heated to a glass softening temperature by means of heaters or the like in the heating furnace 4.

Figure 6:
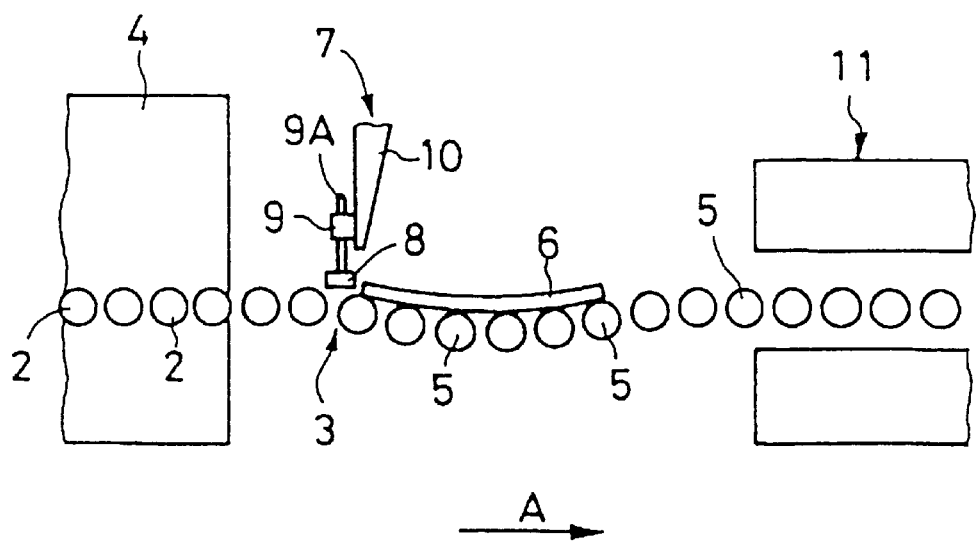
FIG. 6 is a diagram showing a movement of the pusher in the bending step in the first embodiment.

In a bending step, the glass plate 1 heated in the heating step is transferred from the rollers 2 to the curved rollers 5 as shown in FIG. 6. The glass plate 1 is moved on the curved rollers 5 which are arranged with an inclination in the transferring direction A whereby the glass plate is bend-shaped in the transferring direction A so as to follow the inclination of the curved rollers 5, and simultaneously, it is bend-shaped in the transfer perpendicular direction B so as to follow the radius of curvature of the curved rollers 5. Thus, the glass plate 1 is bend-shaped with respect to the transferring direction A and the transfer perpendicular direction B to be the complexly curved glass plate 6.

In a pushing step, the pusher 7 lowers the support pads 8 to a level of the curved rollers 5 by means of the actuator 9, and moves the support pads 8 from an upstream side to a downstream side by means of the moving section 10. In this case, the support pads 8 come to contact with the rear edge of the complexly curved glass plate 6 to support it at two positions.

Figure 4:
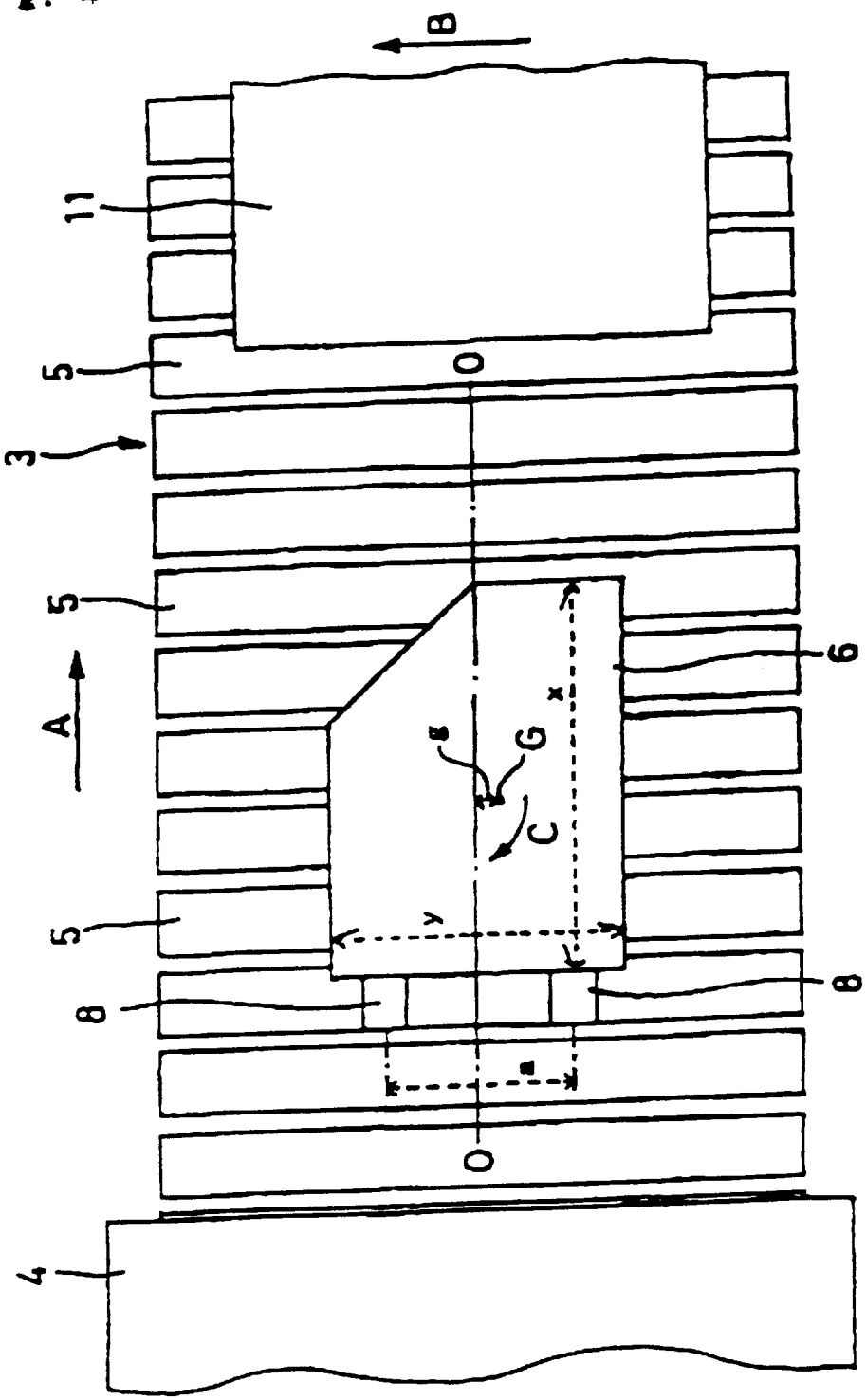
FIG. 4 is an enlarged plan view of a transferring device according to the first embodiment of the present invention.

In this case, when the position of the gravity center G of the complexly curved glass plate 6 is deviated from the center line O—O which is formed by connecting the central portion in the transfer perpendicular direction B as shown in FIG. 4, the gravity center G of the complexly curved glass plate 6 tends to move toward the center line O—O. This causes a tendency of turning the complexly curved glass plate 6 in an arrow mark direction C, for example. However, since the support pads 8 support the rear edge of the complexly curved glass plate 6 at two positions, the pusher 7 can certainly restrict the turning of the complexly curved glass plate 6.

Figure 7:
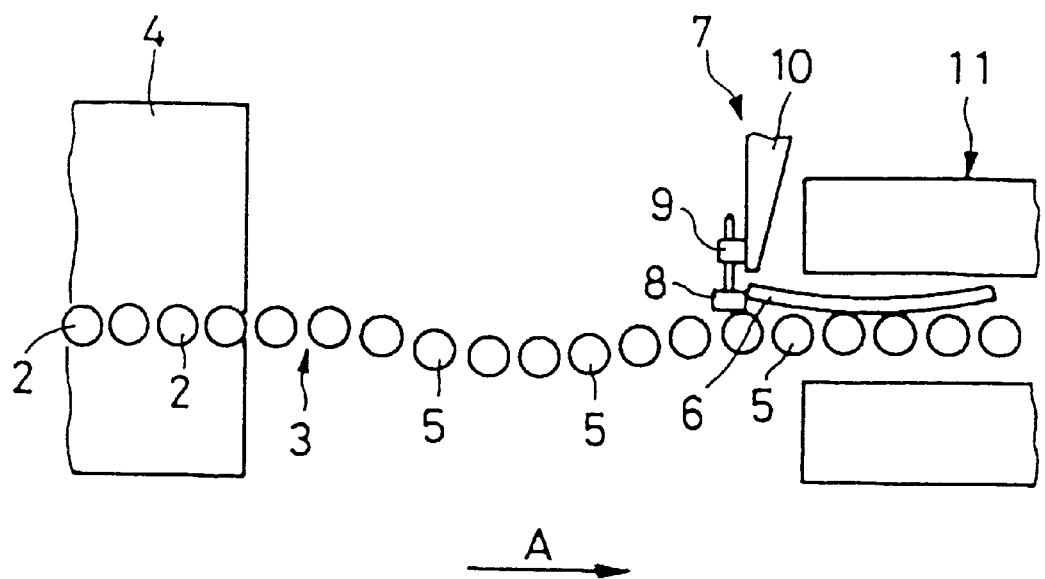
FIG. 7 is a diagram showing a movement of the pusher in a transient time from a pushing step to a cooling step in the first embodiment.
Figure 8:
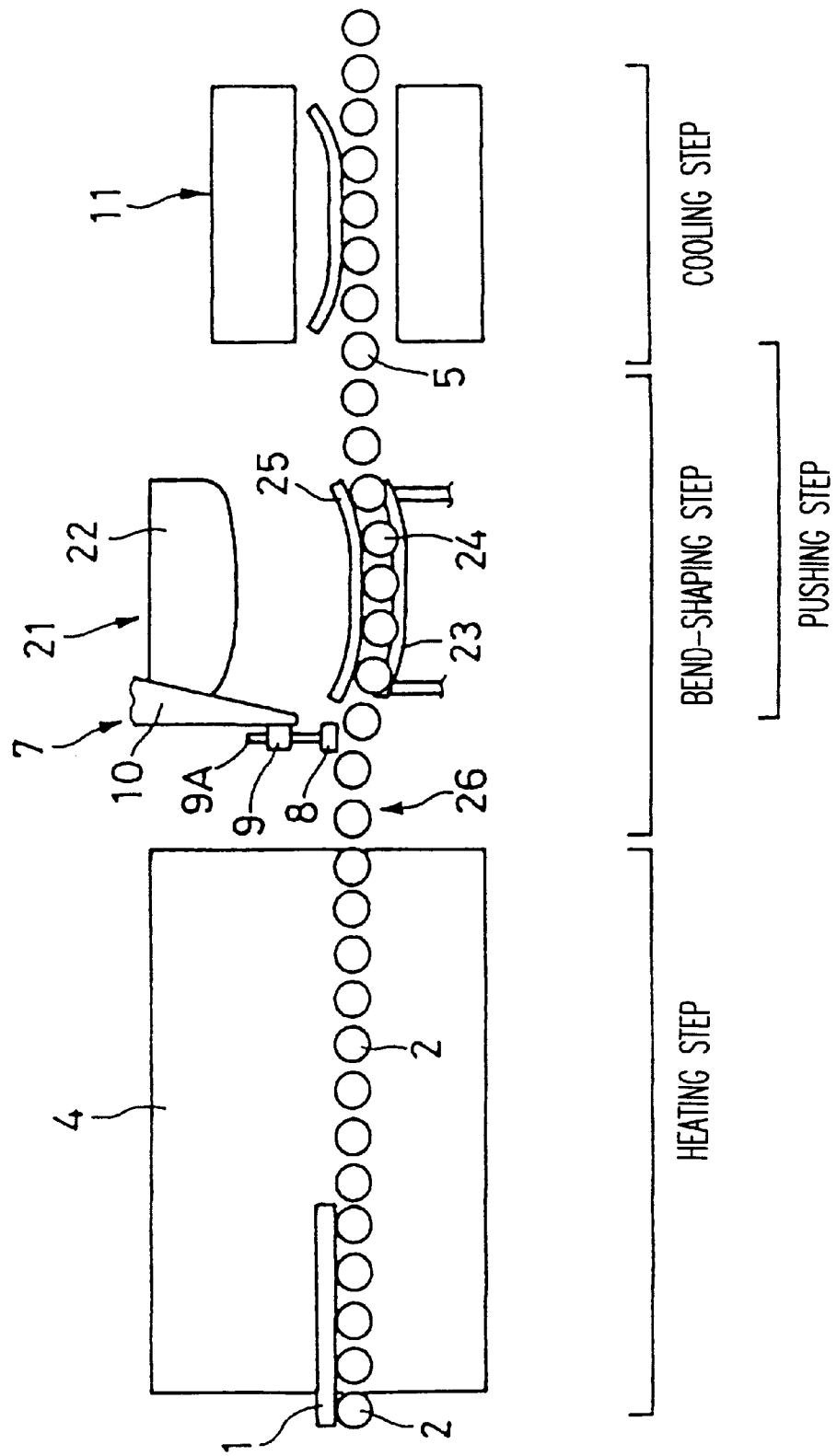
FIG. 8 is an overall structural diagram showing a bending device for a glass plate according to a second embodiment of the present invention.

The pusher 7 moves the support pads 8 along the transferring direction A in a state that the complexly curved glass 6 is supported from its rear edge side by the support pads 8; feeds the complexly curved glass plate 6 on the curved rollers 5 in a state that the turning of the complexly curved glass plate 6 is controlled; and moves the complexly curved glass plate 6 into the cooling device 11 as shown in FIG. 7.

Finally, in a cooling step, cooling air is blasted to the complexly curved glass plate 6 by means of the cooling device 11 to quench and toughen the glass plate 6. When the turning of the complexly curved glass plate 6 or a shift of it in the transfer perpendicular direction B takes place, distances between the complexly curved glass plate 6 and the nozzles 11A, 11B of the cooling device 11 became locally ununiform as shown by two-dotted chain line in FIG. 3. For example, an edge portion of the complexly curved glass plate 6 comes close to the nozzles 11A or 11B of the cooling device 11. In this case, an ununiform temperature distribution is resulted in the complexly curved glass plate 6 whereby an undesired stress is produced after having been quenched. The undesired strain creates a cause of cracking of the complexly curved glass plate.

On the other hand, according to this embodiment of the present invention, the complexly curved glass plate 6 is moved toward the cooling device 11 in a state that the turning is restricted by the support pads 8. Accordingly, the distances between the complexly curved glass plate 6 and the nozzles 11A, 11B of the cooling device 11 can substantially be kept constant and cooling is effected so that a temperature distribution in the complexly curved glass plate 6 is substantially uniform.

Thus, according to this embodiment, the glass plate transferred by the transferring device 3 is heated to a shaping temperature in the heating furnace 4; the glass plate is bend-shaped into the complexly curved glass plate 6 on the curved rollers 5; the complexly curved glass plate 6 is fed to a downstream side on the curved rollers 5 while the rear edge of the complexly curved glass plate 6 is supported by the pusher 7; and the glass plate is quenched and toughened in the cooling device 11. Accordingly, a continuously shaping is possible for complexly curved glass plates while glass plates 1 are transferred by the transferring device 3 Further, the pusher 7 restricts the turning of the complexly curved glass plate 6 by means of the support pads 8 and moves the complexly curved glass plate 6 toward the cooling device 11 by means of the moving section 10. Accordingly, when the complexly curved glass plate 6 is moved to the cooling device 11, the distances between the complexly curved glass plate 6 and the nozzles 11A, 11B of the cooling device 11 can be kept substantially constant whereby the complexly curved glass plate 6 is cooled substantially uniform, and a deformation or an insufficient toughening of the complexly curved glass plate 6 is avoidable.

Further, since the curved rollers 5 are arranged with an inclination with respect to the transferring direction A to thereby bend-shape the glass plate 1 in the transferring direction A so as to follow the inclination of the curved rollers 5. Further, since the glass plate 1 is bend-shaped in the transfer perpendicular direction B by the curved rollers 5, the complexly curved glass plate 6 having radii of curvature in two directions can successively be formed.

Further, since the complexly curved glass plate 6 is moved to the cooling device 11 by the pusher 7 in a state that it is bend-shaped by curved rollers, productivity for the complexly curved plate 6 is not decreased; the turning of the glass plate 6 can be restricted; and a deformation or cracking of the complexly curved glass 6 can be prevented.

FIGS. 8 to 14 show a second embodiment of the present invention. The second embodiment is characterized by forming a complexly curved glass plate by interposing a glass plate between an upper pressing mold and a lower ring mold. The same reference numerals as in the first embodiment designate the same or corresponding parts and description of these parts is omitted.

A press-shaping device 21 is constituted by an upper pressing mold 22 formed to have a shape corresponding to that of a glass plate to be bend-shaped and a lower ring mold 23 corresponding to the shape of a peripheral portion of the upper pressing mold 22 so as to hold the glass plate 1 in association with the upper pressing mold 22.

The upper pressing mold 22 is positioned above the transfer device 3 so as to be vertically movable and is formed to have a curved projection with respect to the transferring direction A and the transfer perpendicular direction B. The upper pressing mold 22 is lowered when it holds the glass plate 1 in association with the lower ring mold 23, and in a time other than being lowered, it stays at a raised position above the transfer device 3 so as not to come to contact with the glass plate 1.

On the other hand, the lower ring mold 23 is positioned below the curved rollers 24 so as to oppose the upper pressing mold 22 and is formed to have a curved recess. When the glass plate 1 is delivered above the lower ring mold 23, it is raised in response to the lowering of the upper pressing mold 22 whereby the glass plate 1 is clamped between the lower ring mold 23 and the upper pressing mold 22. Thus, the glass plate 1 is bend-shaped in the transferring direction A and the transfer perpendicular direction B so as to form a complexly curved glass plate 25 having a predetermined shape.

Figure 9:
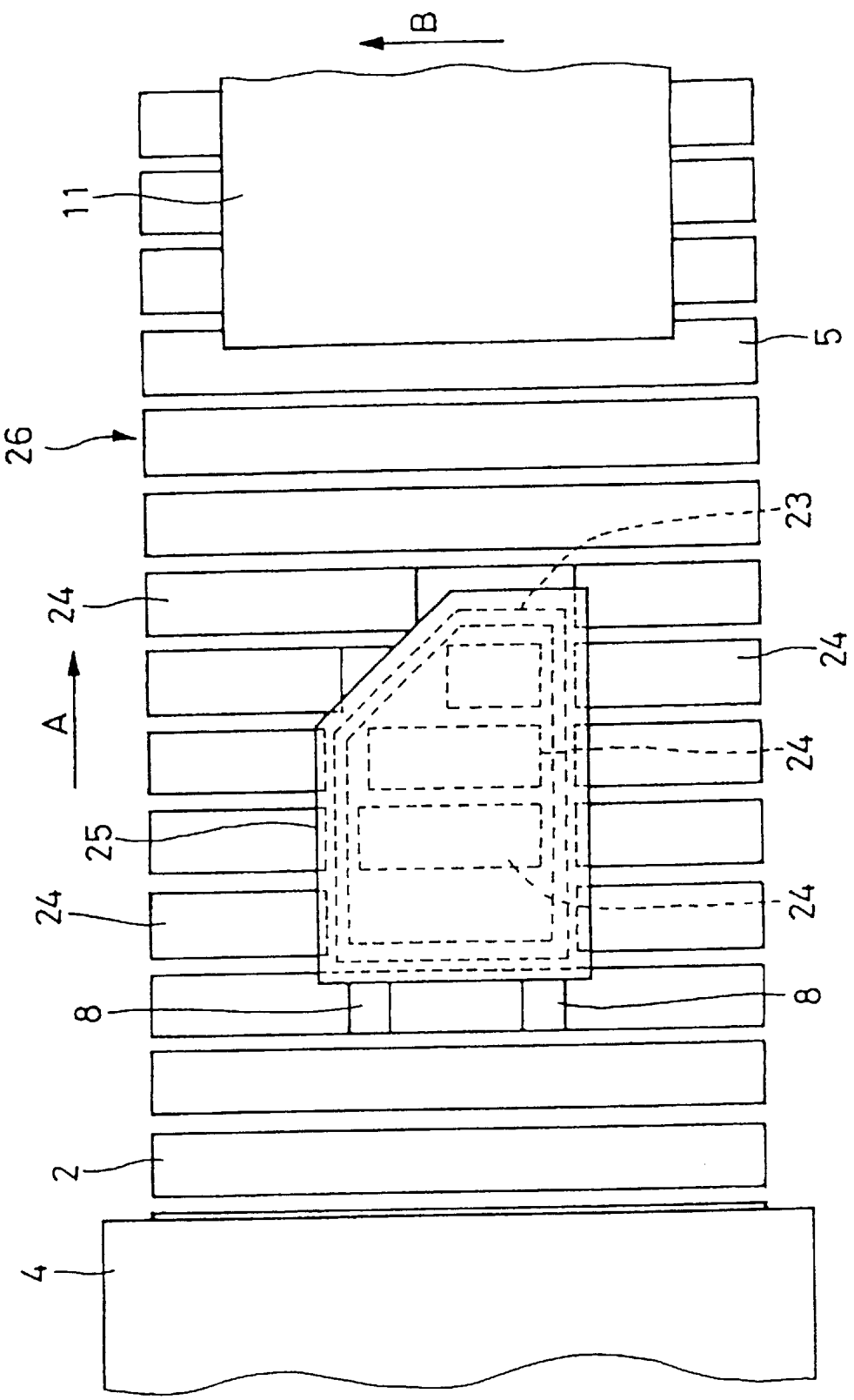
FIG. 9 is an enlarged plan view showing a transferring device and a lower ring mold in the second embodiment.

Curved rollers 24 positioned between the upper pressing mold 22 and the lower ring mold 23 are splitted so as not to contact with the lower ring mold as shown in FIG. 9. The curved rollers 24 are arranged with an inclination with respect to the transferring direction A. When the glass plate 1 is transferred on the curved rollers 24, the glass plate 1 is preliminarily bend-shaped in the transferring direction A. The curved rollers 24 constitute a transferring device 26 in association with the rollers 2 and the curved rollers 5.

A method for bend-shaping a glass plate into the complexly curved glass plate 6 by using the glass plate bending apparatus as described above will be explained with reference to FIGS. 10 to 14.

Figure 10:
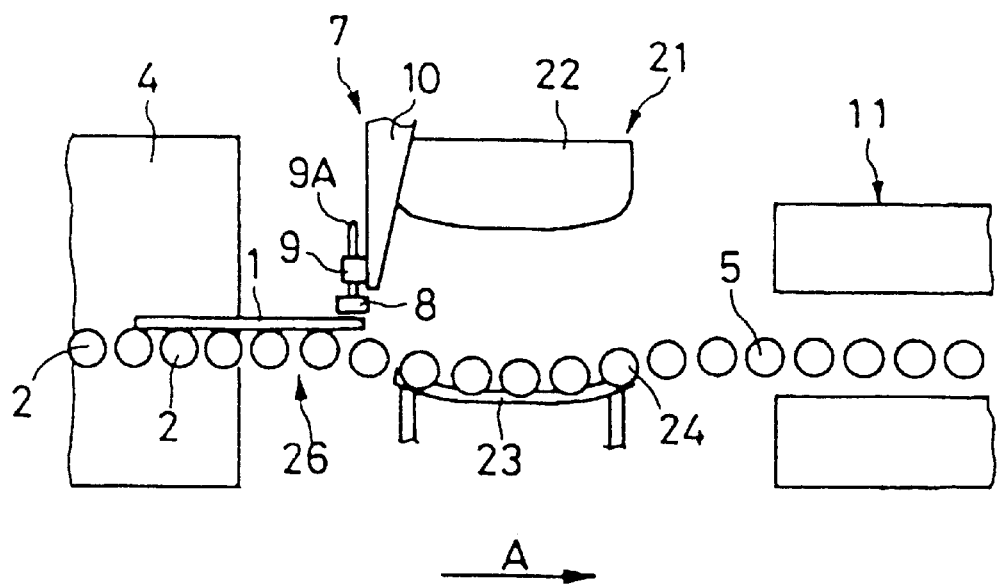
FIG. 10 is a diagram showing a movement of a pusher in a transient time from a heating step to a bending step in the second embodiment.

In a transferring step, the glass plate 1 is placed on the rollers 2 as shown in FIG. 10. By rotating the rollers 2, the glass plate 1 is transferred from an upstream side of the transferring device 26 to its downstream side.

In a heating step, the glass plate 1 is transferred into the heating furnace 4 by means of the transferring device 26 wherein the glass plate 1 is heated to a glass softening temperature by heater or the like in the heating furnace 4.

Figure 11:
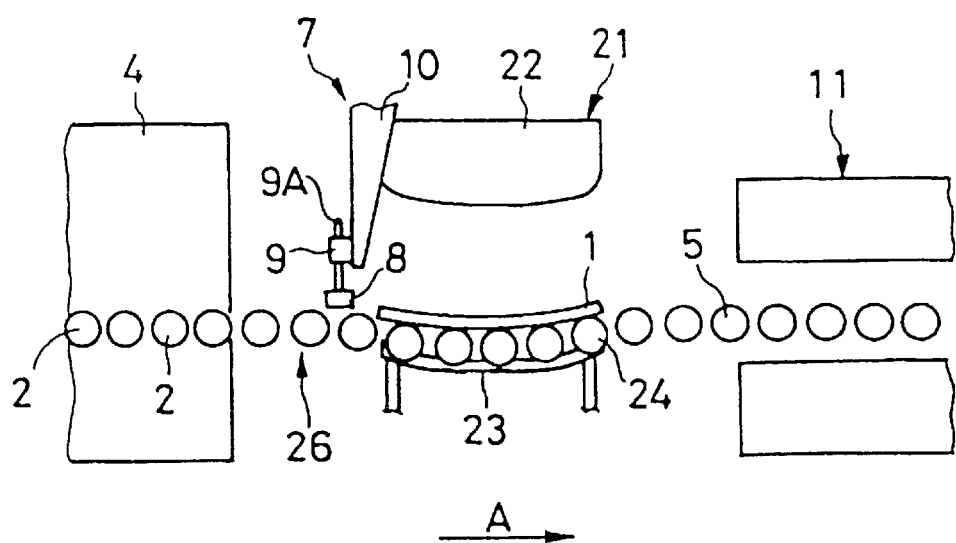
FIG. 11 is a diagram showing a state that a glass plate is preliminarily bend-shaped by curved rollers in the second embodiment.

In a bending step, the glass plate 1 heated in the heating step is transferred from the rollers 2 to the curved rollers 24 as shown in FIG. 11. Then, the glass plate 1 is bend-shaped in the transfer perpendicular direction B so as to follow the radius of curvature of the curved rollers 24, and at the same time, the glass plate is moved on the curved rollers 24 arranged with an inclination in the transferring direction A whereby a preliminarily bend-shaping is conducted in the transferring direction A.

Figure 12:
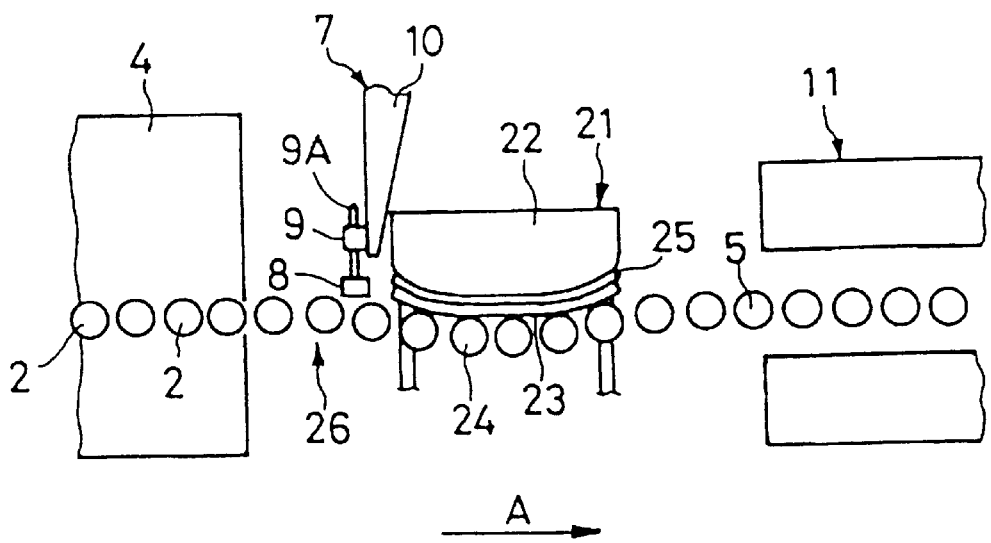
FIG. 12 is a diagram showing a state that the glass plate is held between an upper pressing mold and a lower ring mold in the second embodiment.

As shown in FIG. 12, the press-shaping device 21 is so constructed that when the glass plate 1 is moved above the lower ring mold 23, the lower ring mold 23 is raised upward, and at the same time, the upper pressing mold 22 is lowered, whereby the glass plate 1 is clamped between the lower ring mold 23 and the upper pressing mold 22 to be bend-shaped with respect to the transferring direction A and the transfer perpendicular direction B. Thus, the glass plate is press-shaped into a complexly curved glass plate 25 having a predetermined shape.

Figure 13:
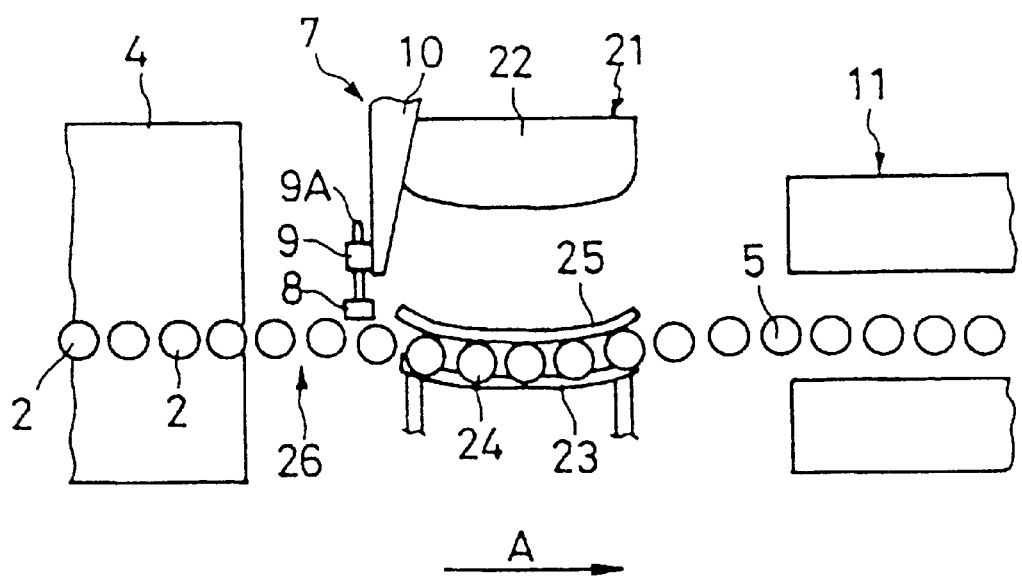
FIG. 13 is a diagram showing the operation of a press-shaping device in a transient time from the bending step to the pushing step in the second embodiment.

When the press-shaping is finished, the lower ring mold 23 is lowered downward and the upper pressing mold 22 is raised upward as shown in FIG. 13, whereby the complexly curved glass plate 25 is on the curved rollers 24.

In a pushing step, the pusher 7 lowers the support pads 8 by the actuator 9 to the curved rollers 24, and moves the support pads 8 by the moving section 10 in a transferring direction A. In this case, the support pads 8 are in contact with the rear edge of the complexly curved glass plate 25 to support it at two positions. Accordingly, the pusher 7 can restrict certainly the turning of the complexly curved glass plate 25.

Figure 14:
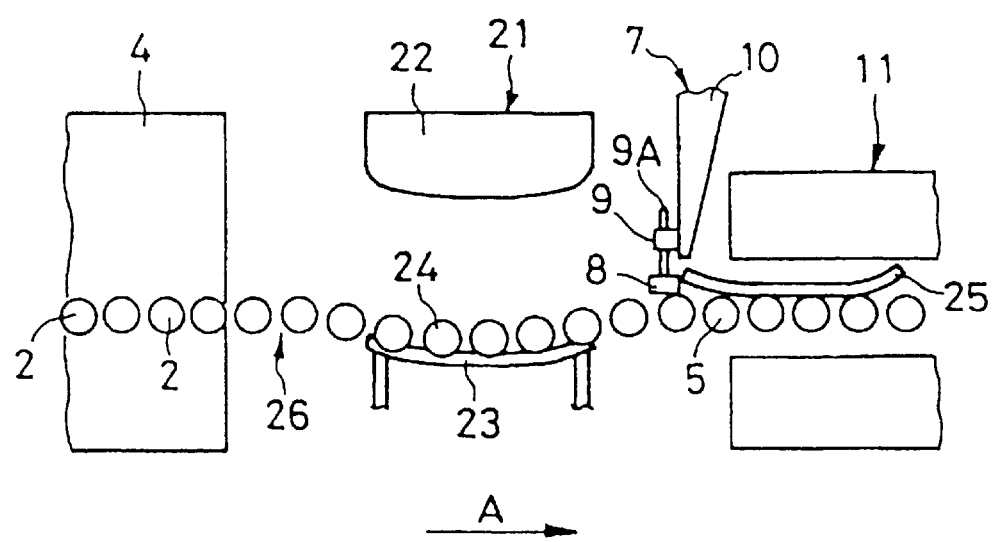
FIG. 14 is a diagram showing a movement of the pusher in a transient time from the pushing step to a cooling step in the second embodiment.

Then, the pusher 7 moves the support pads 8 in the transferring direction A in a state that the support pads 8 support the complexly curved glass plate 24 form its rear edge side as shown in FIG. 14. Further, it feeds the complexly curved glass plate 25 on the curved rollers 24 while the turning of the complexly curved glass plate 25 is restricted, and the complexly curved glass plate 25 is moved to the cooling device 11.

In a cooling step, cooling air is blasted to the complexly curved glass plate 25 by means of the cooling device 11 to quench and toughen the glass plate 25. Since the complexly curved glass plate 25 is transferred to the cooling device 11 in a state that the turning is restricted by the support pads 8, the distances between the complexly curved glass plate 25 and the nozzles 11A, 11B of the cooling device 11 can be kept substantially constant and cooling is conducted so that a temperature distribution in the complexly curved glass plate 25 is substantially uniform.

According to this embodiment wherein the complexly curved glass plate 25 is press-shaped by the press-shaping device 21, the glass plate 1 can further largely be bent, and the complexly curved glass plate 25 can certainly be bend-shaped in a predetermined shape. Even in the complexly curved glass plate 25 having a larger radius of curvature for which the posture becomes unstable, it can be transferred to the cooling device 11 by the pusher 7 without the turning of the glass plate 25, whereby locally cooling to the complexly curved glass plate 25 can be prevented and a deformation of the complexly curved glass plate 25 or the like is prevented.

In each of the above-mentioned embodiments, the construction that the rear edge of the complexly curved glass plate 6 is supported by two support pads 8 is shown. However, the present invention is not limited thereto, and three or more support pads may be used. Further, a single support pad which is in a line contact or a face contact with the rear edge of the complexly curved glass plate may be used.

In the second embodiment, such construction that the curved rollers 24 are arranged with an inclination with respect to the transferring direction A to provisionally bend-shape the glass plate 1 is used. However, the provisional bend-shaping is not always necessary, and the curved rollers 24 may be arranged horizontally.

Further, in the second embodiment, such construction that the glass plate 1 is interposed between the upper pressing mold 22 and the lower ring mold 23 is used. However, a structure that the glass plate 1 is interposed between the upper pressing mold 22 and the curved rollers 24 may be used.

The method and the apparatus for bend-shaping a glass plate according to the present invention are in particular applicable to bend-shaping a glass plate for a side window of automobile rather than a glass plate for a rear window. Namely, the glass plate for a side window often takes a shape analogous to a trapezoidal shape whereas a glass sheet for a rear window is nearly rectangular. Accordingly, the gravity center G of the glass plate for the side window tends to deviate from the centerline (O—O in FIG. 4) of the glass plate in the transferring direction on the rollers. Further, the size of the glass plate is not so large with respect to the distance g between the gravity center G and the centerline O—O. Accordingly, the turning of the glass plate is apt to take place in a bend-shaping operation to the glass plate for a side window. Accordingly, the bend-shaping device of the present invention is particularly useful for bend-shaping the glass plate for a side window.

As an example of dimensions of the glass plate in the present invention, a dimension x along the transferring direction A is 300–1200 mm and a dimension y along the transfer perpendicular direction b is about 300–800 mm wherein y represents the dimension of a longer side of the glass plate having a trapezoidal shape along the transfer perpendicular direction B. Typical dimensions of a glass plate for a side window of automobile for which the bend-shaping device according to the present invention is in particular preferably used are (xxy)=(800–1000×400–600) mm.

Since the glass plate for a side window is substantially trapezoidal, the turning of the complexly curved glass plate often takes place during the transferring of the glass plate on the rollers. As described before, the turning of the complexly curved glass plate is caused by a deviation between the centerline O—O in the transferring direction and the gravity center G of the glass plate and dimensions of the glass plate. Accordingly, the method and the apparatus for bend-shaping a glass plate according to the present invention is useful for the glass plate having the above-mentioned dimensions and having a predetermined relation of the distance g between the centerline O—O and the gravity center G of the glass plate. Specifically, the method and the apparatus for bend-shaping a glass plate of the present invention is useful for bend-shaping a glass plate having a relation of g/y=1/30–1/5, particularly, g/y=1/20–1/10 and dimensions of (x×y)=(300–1200×300–800)mm. The distance g can be considered as an index indicating a degree of a substantially trapezoidal shape of the glass plate.

In the present invention, it is preferable to support the rear edge of the complexly curved glass plate by at least two support pads. On the other hand, if the distance between these support pads is too close, the turning of the glass plate can not sufficiently be controlled. Accordingly, the distance a between support points of the support pads for supporting the glass plate is preferably 2 times or more than g.

In the first and second embodiments, when an area of each of the support pads in contact with the complexly curved glass plate has a certain amount of width, the distance between the centers in the contacting areas can be considered as the distance a. A preferable range of the distance a in which the glass plate can be pushed in a stable manner is a=200–400 mm (since the distance a is smaller than the dimension y, the value of a is less than 300 when y is less than 300 mm).

When three or more support pads are used, the distance a should be a distance between the outermost support pads (which are closer to both sides of the glass plate). When a single support pad which is in line contact or a face contact with the rear edge of the complexly curved glass plate is used, it is preferable that the width of the contacting area to the rear edge of the complexly curved glass plate is 200–500 mm.

Obviously, numerous modifications and variations of the present invention are possible in light of the above teachings. It is therefore to be understood that within the scope of the appended claims, the invention may be practiced otherwise than as specifically described herein.

What is claimed is:

1. A method for bend-shaping a glass plate which comprises:
    a transferring step of placing a glass plate on a plurality of rotating rollers to transfer the glass plate in a transferring direction A;
    a heating step of heating the glass plate transferred in the transferring step to a shaping temperature in a heating furnace;
    a bending step of bend-shaping the glass plate heated in the heating step to form a complexly curved glass plate having radii of curvature in plural directions; and
    a cooling step of cooling the complexly curved glass plate transferred in the transferring step in a cooling device provided at a downstream side of the bending step, wherein a pushing step is provided between an upstream end of the bending step and an upstream end of the cooling step to move the complexly curved glass plate on the rollers in the transferring direction A by pushing an upstream side edge of the complexly curved glass plate, the pushing step being reciprocated between the upstream end of the bending step and the upstream end of the cooling step.

2. The method for bend-shaping a glass plate according to claim 1, wherein in the pushing step, the complexly curved glass plate is moved at a transfer speed slightly faster than the transfer speed of the transferring step on the rollers in the transferring direction A.

3. The method for bend-shaping a glass plate according to claim 1, wherein in the pushing step, the complexly curved glass plate is pushed by making support pads contact with at least two positions along said upstream side edge of the complexly curved glass plate to move the complexly curved glass plate on the rollers in the transferring direction A.

4. The method for bend-shaping a glass plate according to claim 3, wherein in the pushing step, a distance a between two positions where the support pads are in contact with the complexly curved glass plate is twice or more than a distance g between the center line O—O of the transferring direction A of the glass plate and the gravity center G of the glass plate.

5. The method for bend-shaping a glass plate according to claim 3, wherein in the pushing step, a distance a between the two positions where the support pads are in contact with the complexly curved glass plate is in a range of 200–400 mm.

6. The method for bend-shaping a glass plate according to claim 1, wherein the glass plate to be bend-shaped has a length x of 300–1200 mm in the transferring direction A and a length y of 300–800 mm in a transfer perpendicular direction B.

7. The method for bend-shaping a glass plate according to claim 1, wherein a distance g between the center line O—O in the transferring direction A and the gravity center G is 1/30–1/5 as much as a length y in a transfer perpendicular direction B.

8. The method for bend-shaping a glass plate according to claim 3, wherein the glass plate to be bend-shaped has a length x of 300–1200 mm in a transferring direction A and a length y of 300–800 mm in a transfer perpendicular direction B.

9. The method for bend-shaping a glass plate according to claim 8, wherein a distance g between the center line O—O in the transferring direction A and the gravity center G is 1/30–1/5 as much as a length y in a transfer perpendicular direction B.

10. An apparatus for bend-shaping a glass plate which comprises:
    a transferring means for mounting a glass plate on a plurality of rotating rollers to transfer the glass plate in a transferring direction A;
    a heating furnace provided at an upstream side of the transferring means to heat the glass plate to a shaping temperature;
    a bend-shaping means provided at a downstream side of the heating furnace to bend-shape the glass plate into a complexly curved glass plate having radii of curvature in plural directions; and
    a cooling means provided at a downstream side of the bend-shaping means to cool the complexly curved glass plate transferred by the transferring means, wherein a pushing mechanism is provided between an upstream end of the bend-shaping means and an upstream end of the cooling means to move the complexly curved glass plate on the rollers in the transferring direction A by pushing an upstream side edge of the complexly curved glass plate, the pushing means being reciprocated between the upstream end of the bend-shaping means and the upstream end of the cooling means.

11. The apparatus for bend-shaping a glass plate according to claim 10, wherein the pushing mechanism moves the complexly curved glass plate at a transfer speed slightly faster than the transfer speed of the transferring means on the rollers in the transferring direction A.

12. The apparatus for bend-shaping a glass plate according to claim 10, wherein the pushing mechanism comprises support pads coming to contact at at least two positions along said upstream side edge of the complexly curved glass plate, an actuator for moving vertically the support pads and a moving section for reciprocating the support pads between the upstream end of the bend-shaping means and the upstream end of the cooling means.

13. The apparatus for bend-shaping a glass plate according to claim 12, wherein the support pads are attached to the actuator by interposing an elastic material, and each of the support pads has a projection, in the plane opposing the rollers of the transferring means, to be received in a groove formed in the rollers so that the support pads are in electrical contact with the rollers whereby a position in a vertical direction of the support pads is determined in response to a position in a vertical direction of the complexly curved glass plate on the rollers.

14. The apparatus for bend-shaping a glass plate according to claim 12, wherein at least two support pads are provided, and a distance a between two support pads at the outermost positions is twice or more than a distance g between the center line O—O of the transferring direction of the glass plate and the gravity center G of the glass plate.

15. The apparatus for bend-shaping a glass plate according to claim 12, wherein at least two support pads are provided, and a distance a between two support pads at the outermost positions is in a range of 200–400 mm.

16. The apparatus for bend-shaping a glass plate according to claim 10, wherein the glass plate to be bend-shaped has a length x of 300–1200 mm in a transferring direction A and a length y of 300–800 mm in a transfer perpendicular direction B.

17. The apparatus for bend-shaping a glass plate according to claim 16, wherein a distance g between the center line O—O in the transferring direction A and the gravity center G is 1/30–1/5 as much as a length y in a transfer perpendicular direction B.

18. The apparatus for bend-shaping a glass plate according to claim 14, wherein the glass plate to be bend-shaped has a length x of 300–1200 mm in a transferring direction A and a length y of 300–800 mm in a transfer perpendicular direction B.

19. The apparatus for bend-shaping a glass plate according to claim 18, wherein a distance g between the center line O—O in the transferring direction A and the gravity center G is 1/30–1/5 as much as a length y in a transfer perpendicular direction B.

* * * * *